Feb. 18, 1936.     F. C. WAPPLER     2,031,020
SURGICAL ENDOSCOPIC INSTRUMENT
Filed Dec. 18, 1931     2 Sheets-Sheet 1
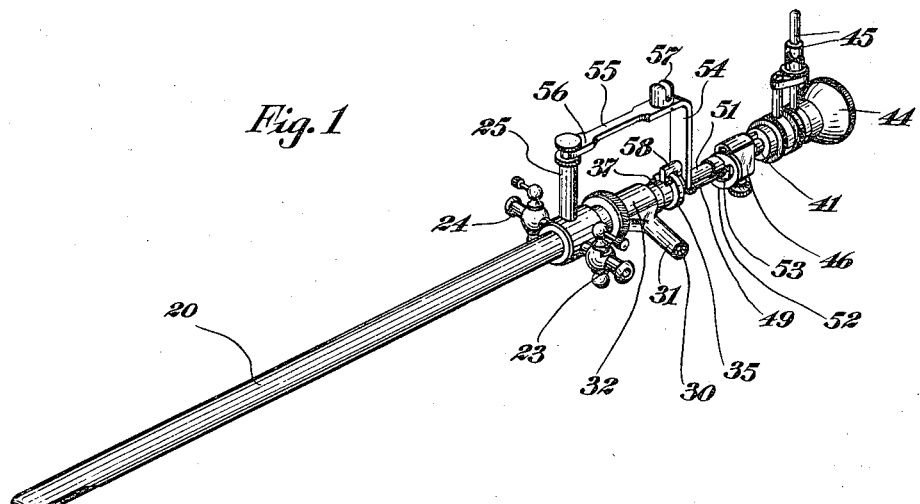
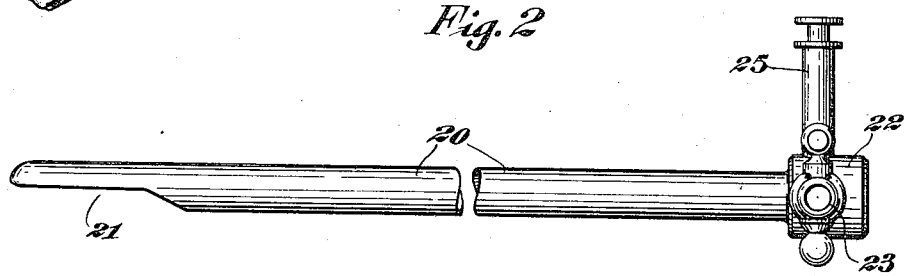
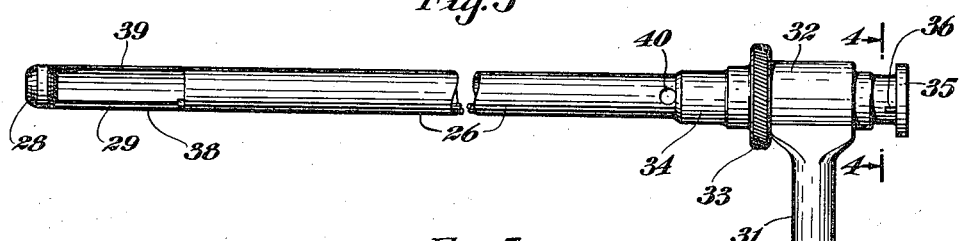
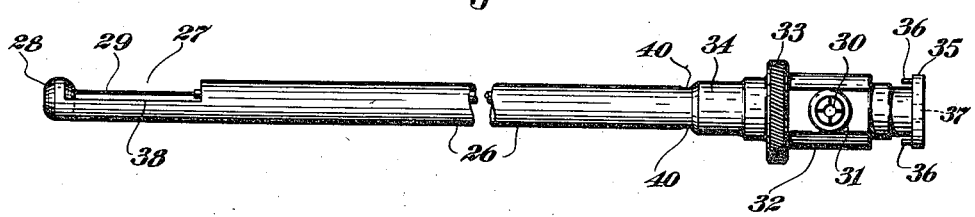
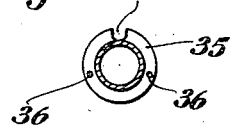
INVENTOR.
Frederick Charles Wappler,
BY Frederick Breitenfeld
ATTORNEY Patented Feb. 18, 1936

2,031,020

UNITED STATES PATENT OFFICE 2,031,020

SURGICAL ENDOSCOPIC INSTRUMENT

Frederick Charles Wappler, New York, N. Y.

Application December 18, 1931, Serial No. 581,907

15 Claims. (Cl. 174—89)

My present invention relates generally to surgery, and has particular reference to a surgical endoscopic instrument of unique characteristics and capabilities.

My invention is directed primarily toward the alleviation of ailments due to protrusions, such as tumor masses or the like, in body cavities. As an example of the uses to which my present instrument is particularly adapted, protrusions at the deep urethra or bladder neck, caused, for example, by enlargement or ailments of the prostate gland, are typical. It will be understood, however, that my present instrument, and the several distinctive features and characteristics thereof, is capable of a wide variety of uses and applications and is by no means restricted to the treatment of obstructions or the like in the urethra.

It is a general object of my invention to provide an instrument by means of which internal protrusions or the like may be subjected to treatments which result in their elimination, more especially by a resection or excision accomplished by electrical means; the treatment being accomplished under illuminated vision and in a highly expeditious and simplified manner.

One of the features of my invention lies in the provision of an instrument whereby an excision may be effected in a direction substantially transverse to the axis of the cavity in which the protrusion exists. It is a specific feature of my invention to provide an operative electrode whose construction and arrangement are such that after the protrusion, or any part thereof, has been engaged, as, for example, within the fenestra of an endoscopic tube, the engaged mass may be cut or excised from the cavity wall by a transverse movement of the electrode.

Another feature of my invention lies in the provision of an improved means for effectively ensnaring or entrapping the excised mass, and for facilitating its rearward withdrawal out of the cavity.

Another feature of my invention lies in the provision of an arrangement whereby a cavity wall portion, such as a protrusion, may be preliminarily treated in situ for the purpose of "cooking" the same, it being understood that the use of the term "cooking" implies a treatment which is distinct from a mere heating, as in diathermy, and also distinct from a burning or searing, as in cauterization, the treatment which I have referred to as "cooking" being one whereby the cavity wall portion, such as a tumor mass, is coagulated. More particularly, this is accomplished by means of an electric current, usually a high-frequency current, which is caused to pass through the mass to be treated with the result that the mass is bloodlessly coagulated.

A further feature of my invention lies in the provision of an instrument whereby this "cooking" may be accomplished prior to the excision, in the manner hereinbefore mentioned, of the cavity wall portion thus treated, the actual removal or cutting away of the protrusion being thereby greatly facilitated and being rendered practically, if not entirely, bloodless.

A particular feature of my invention lies in the provision of an instrument in which a single electrode may be selectively employed to accomplish either the preliminary "cooking" or the final resection, or both. With this object in view, my instrument is characterized by a fenestra whose size or width is adjustable, whereby, during the cooking procedure, the width may be narrowed sufficiently to prevent the exposed cavity wall portion from protruding into the instrument; and whereby, during the excision, the fenestra may be effectively enlarged so as to permit the mass to be engaged in the fenestra.

In the preferred embodiment herein illustrated by way of example, I have shown an outer fenestrated endoscopic tube in association with an inner electrode tube which is snugly yet rotatably mounted in the endoscopic tube. The inner tube has a lateral fenestra which may be brought into greater or lesser registry with the endoscopic fenestra so that the width of the effective fenestra may be varied. Within the confines of the inner electrode tube I arrange a novel form of electrode which is adapted to perform either or both of the functions of electrically cooking the cavity wall portion which is exposed through the fenestra (but which does not protrude into the latter), or actually resecting such cavity wall portion as may be caused to protrude into the instrument.

Other features of my invention lie in the association, with an electrode tube of the foregoing character, of a telescope which is rotatably and axially adjustable in a novel and efficient manner, whereby the telescope may be expeditiously adjusted either into positions commanding a full and efficient view of certain procedures, or into other positions which withdraw the telescope from the field of action of certain other procedures.

In general, it is an object of my invention to provide an instrument which is not only simple and reliable, but which is highly efficacious in fulfilling its contemplated functions; to provide a compact and workmanlike mechanism capable of production in a practical and commercial manner, adapted to be expeditiously constructed, assembled, adjusted, and manipulated, and embodying in an efficient manner the capabilities and characteristics which my general objectives necessitate.

I achieve the foregoing objects and advantages, and such other objects and advantages as may hereinafter appear or be pointed out, in the manner illustratively exemplified in the accompanying drawings, wherein—

Figure 1 is a perspective view of an assembled instrument of the present character;

Figure 2 is a side view of the outer endoscopic tube, by itself;

Figure 3 is a side view of the inner electrode tube, by itself;

Figure 4 is a cross-sectional view taken substantially along the line 4—4 of Figure 3;

Figure 5 is a view taken at right angles to Figure 3;

Figure 6:
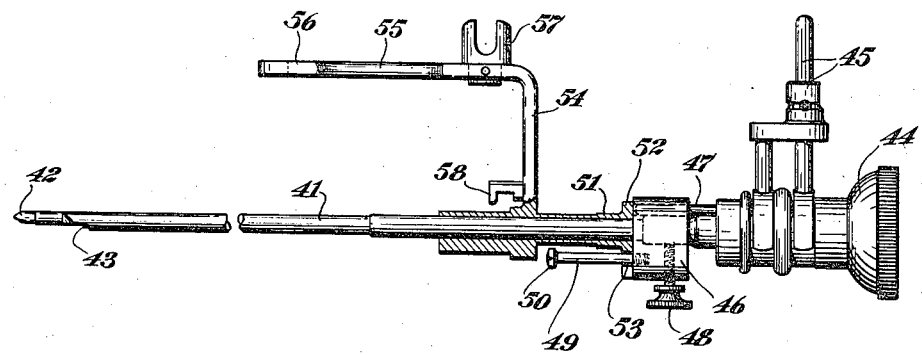
Figure 6 is a side view of the telescope and associated parts, by itself.

My instrument will be more fully understood, and its manner of assembly and use more fully appreciated, by a description of its component parts.

In Figure 2, I have shown an outer endoscopic tube 20 which is provided at its forward end with a substantially lateral fenestra 21. At its rear end, it is preferably provided with a collar 22 to opposite sides of which petcocks 23 and 24 are mounted for the inflow and outflow of an irrigating liquid medium. On the collar 22 I also mount a post 25 for facilitating the association, with the tube 20, of certain other parts of the instrument. The width of the fenestra 21 extends substantially through approximately 180°.

In Figures 3, 4, and 5 I have illustrated the inner electrode tube which is adapted to fit snugly yet rotatably within the outer endoscopic tube 20. This tube, 26, is provided near its forward end with a lateral fenestra 27 whose width extends substantially through 180° and which is so positioned that it will align with the fenestra 21 when the parts are assembled. At the forward end of the tube 26 I provide an insulating body or plug 28 in which the forward end of a wire electrode 29 is securely anchored. The electrode 29 extends rearwardly through the tube 26 and is ensheathed in a tube of insulating material around which an outer sheath of metal is provided, the outer sheath being welded or similarly secured to the inner surface of the tube 26. At its rear end, the conductive wire 29 communicates with the slit binding post terminal 30 mounted within the projection 31 upon the collar portion 32. Forwardly of the portion 32 is a knurled flange 33; and forwardly of this flange is a collar 34 which is adapted to fit snugly yet rotatably within a corresponding bore in the collar 22. At its extreme rear end, the tube 26 is provided with the flange 35 having circumferentially spaced pins or projections 36 on its forward surface and being provided, also, with a notch 37 midway between the pins.

The exposed and uninsulated electrode wire 29 is the operative electrode portion of the device, and it is effectively insulated from the tube 26 not only by means of the plug 28 but also by means of the insulating sheath hereinbefore mentioned. Its connection with the terminal 30, though not illustrated in detail, is also such as to maintain the electrode 29 in insulated relationship from the tube 26. Preferably, though not necessarily, the entire collar portion 32 and the post 31 may be of insulating material.

Upon viewing Figures 3 and 5 it will be noted that the electrode wire 29 is arranged closely adjacent to, though spaced from, the contiguous edge 38 of the fenestra 27. This edge, and the tube portion between it and the opposite edge 39, serves as a scoop which entraps and picks up the masses which are excised by the electrode 29.

The oppositely arranged openings 40, just forwardly of the collar 34, are adapted to register with the petcocks 23 and 24 to provide for the inflow and outflow of liquid.

The telescope 41 which I have illustrated in Figure 6 is preferably of the type shown in Patent No. 1,680,491, being provided with an illuminating lamp 42 at its forward end and an objective lens 43 which commands a forwardly oblique field of vision. At its rear end, the telescope is provided with the usual eyepiece 44 and with the terminal members 45 to which the suitable electrical connection may be made for operating the lamp 42.

The telescope is provided with a projection 46, preferably secured in firm position by means of the pin 47 and the set screw 48, and this projection carries a forwardly extending pin 49 provided at its end with the enlarged head 50.

The telescope is rotatably and axially journaled within a bearing member 51 which engages around the telescope immediately in front of the projection 46. At its rear end, the bearing membe 51 is provided with the flange 52 which has an acuate slot 53 though which the pin 49 extends. The ends of this slot limit the rotative movements of the telescope with respect to the bearing member 51, and the pin head 50 limits the rearwardly retractive, axial movement of the telescope with respect to the bearing member 51. The forward, axial movement is limited by the projection 46, itself. The projection 46 and the head 50 serve as abutments at the opposite ends of the pin 49 for limiting the axial adjustments of the telescope with respect to the bearing member 51.

The bearing member 51 is also provided with a post 54 extending transversely therefrom and provided with the forward arm 55 bifurcated at its forward free end 56. This bifurcated end is adapted to engage with the post 25, as indicated most clearly in Figure 1, to interlock the bearing member 51 with the endoscopic tube 20.

The slotted projection 57 is merely a convenient holder for the lead wire extending to the terminal 30.

On its forward face, the post 54 is provided with the angular projection 58 adapted to engage around the flange 35. In associating the telescope with the electrode tube 26, the projection 58 is caused to pass through the notch 37 in the flange 35, and after this assembly has been effected, the rotative movements of the electrode tube 26 are limited by the fact that one or the other of the pins 36 abuts against the projection 58.

In assembling the parts, the telescope 41 and bearing member 51 are first inserted into the electrode tube 26, the projection 58 being passed forwardly through the notch 37 in the manner hereinbefore described. This assembly is then inserted into the endoscopic tube 20 so that the arm 55 interlocks with the post 25.

When thus assembled, the parts are relatively movable and immovable, as follows. The endoscopic tube 20 is interlocked in immovable relationship with the bearing member 51. The electrode tube 26 is rotatable through an arc of approximately 180°, the rotative movements being limited by the pins 36 and the projection 58. The telescope is rotatable within the bearing member 51 between the limits imposed by the ends of the arcuate slot 53. The telescope is axially movable within the limits imposed by the projection 46, the head 50, and the flange 52. The entire electrode tube 26, together with the bearing member 51 and the telescope 41, are withdrawable as a unit from the endoscopic tube 20.

Although the manner in which my instrument is to be used will depend largely upon the particular operations to be accomplished thereby and upon the particular desires of the operator, I have illustratively shown in Figures 7-11 the manner in which the instrument is capable of one typical mode of treatment.

Assuming that there is a cavity wall portion, such as a swelling or protrusion, which is to be excised, the instrument is inserted into the cavity to the point where the particular cavity wall portion lies alongside of the fenestrae 21 and 27. The actual insertion of the instrument will, of course, be accomplished with the aid of an obturator, which is not herein illustrated. The inner electrode tube is then rotated into a relationship where the effective fenestra is sufficiently narrow to prevent the cavity wall portion from projecting into the instrument. This adjustment of the parts is illustratively shown in Figure 7. The telescope 41 is also advanced to its fullest extent and is rotatively adjusted into a position at which it commands a view of the effective fenestra and of the cavity wall portion exposed therethrough.

A liquid medium is then introduced, and a suitable type of high-frequency current is caused to be passed through the electrode 29. It will be understood that the terminal 30 is connected by a suitable lead with one terminal of the high-frequency source, while the patient, himself, is either grounded or suitably connected with the other terminal of the high-frequency source.

As a result of this procedure, high-frequency current will pass from the electrode 29 through the liquid medium, to and through the exposed cavity wall portion designated by the reference numeral 58. If the procedure is properly carried out, this passage of current will cause the portion 58 to become electrically "cooked", or coagulated. This is accomplished despite the fact that the electrode 29 has no direct contact with the portion being treated.

Figure 7:
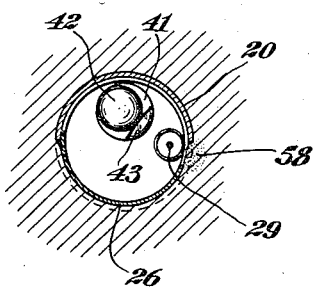
Figures 7–11 are enlarged cross-sectional views through the instrument (with certain elements omitted for the sake of clearness), showing one manner of use.
Figure 8:
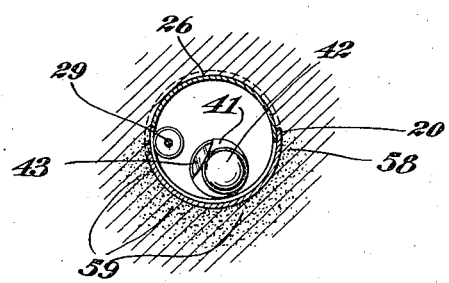

The entire instrument is then slowly rotated from the position of Figure 7 to the position of Figure 8, or through such partial rotation as particular instances may require. As the effective fenestra sweeps past successive areas of the cavity wall portion, these areas will be successively "cooked", as indicated by the darkened mass 59 of Figure 8. This entire procedure is carried out under illuminated vision and is capable of accomplishment because of the fact that the cavity wall portions are prevented, by the narrowness of the effective fenestra, from protruding into the instrument and hence into contact with the electrode 29.

After this preliminary cooking or coagulation has been accomplished, the cavity wall portion thus treated is ready for excision.

Figure 9:
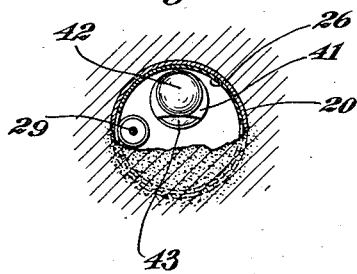

To accomplish this, the parts are adjusted into the relationship of Figure 9. It is to be noted that the electrode tube 26 has been rotated so as to enlarge the effective fenestra and to permit the treated cavity wall portion (which may be a protrusion, as hereinbefore stated) to project into the instrument. The telescope is preferably adjusted into the normal position of Figure 9 so that the proper ensnarement of the treated protrusion may be observed under illuminated vision.

Preferably, though not necessarily, the telescope is at this time retracted axially so that it may be withdrawn from the field of action of the excising electrode 29, the retracted position being one in which the tip of the telescope is just rearwardly of the effective fenestra of the instrument.

Figure 10:
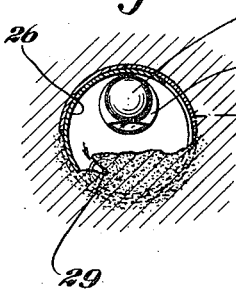
Figure 11:
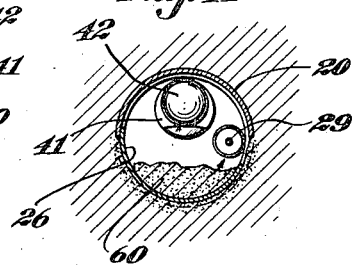

The outer endoscopic tube 20 is then held stationary, while the inner electrode tube 26 is slowly rotated from the position of Figure 9 through the position of Figure 10, into the final position of Figure 11. During this rotation, the electrode 29 will be brought into direct contact with the cooked protrusion and an electrical "cutting" will be effected. Obviously, the characteristics of the high-frequency current may have to be adjusted to effect this result, but the source of high-frequency current and its manner of adjustment or manipulation forms no part of my present invention.

As the cutting proceeds, it will be noted that the semi-circular portion of the tube 26 lying behind the fenestra 27 will serve as a scoop to pick up and entrap the excised mass. In Figure 11, for example, the entire excised mass 60 is accommodated by this scoop. At this stage, the electrode tube and its associated parts are withdrawn rearwardly through the tube 20 and the excised mass may be inspected and discarded. The operation may then be complete, or it may be necessary to repeat the procedure to excise or resect an additional portion or portions of the cavity wall.

The preliminary treatment of the cavity wall portion is highly desirable because it renders the ultimate resection almost entirely bloodless. This preliminary treatment is capable of accomplishment, as hereinbefore described, by the very electrode which ultimately performs the cutting. One of the main features of my instrument, permitting this to be accomplished, lies in the fact that the fenestrae 21 and 27 may be adjusted into a lesser degree of registry so that the effective fenestra may be made sufficiently small to prevent the cavity wall portion from projecting into the instrument.

The ultimate resection, it will be noted, is accomplished by a transverse sweep of the electrode 29, and this feature of operation is the direct result of the particular manner in which my instrument is constructed and assembled. A transverse excision of this character is highly desirable for a number of reasons.

In general, it will be seen that I have provided an instrument of relative simplicity, whose operative characteristics are capable of a wide variety of uses, and which is nevertheless reliable and efficient in fulfilling its contemplated functions.

It will be understood that the tube 20 may be made either of metal or of insulating material, such as hard rubber or bakelite.

It will be obvious that changes in the details herein described and illustrated for the purpose of explaining the nature of my invention may be made by those skilled in the art without departing from the spirit and scope of the invention as expressed in the appended claims. It is therefore

Having thus described my invention, and illustrated its use, what I claim as new and desire to secure by Letters Patent is—

1. In an instrument of the character described, a laterally fenestrated endoscopic tube insertable into a body cavity, means for varying the size of said fenestra so that it may be made sufficiently small to prevent the exposed cavity wall portion from protruding into said tube, and means wholly within the confines of said tube for electrically cooking said cavity wall portion.

2. In an instrument of the character described, a laterally fenestrated endoscopic tube insertable into a body cavity, means for varying the width of said fenestra so that it may be made sufficiently narrow to prevent the exposed cavity wall portion from protruding into said tube, and means wholly within the confines of said tube for electrically cooking said cavity wall portion, said means comprising a wire electrode arranged longitudinally behind said fenestra.

3. In an instrument of the character described, a laterally fenestrated endoscopic tube insertable into a body cavity, a laterally fenestrated electrode tube snugly yet rotatably nested within the endoscopic tube, the fenestrae being adapted to be brought into greater or lesser registry by rotation of the electrode tube, whereby the width of the effective fenestra may be varied, and means wholly within the confines of said electrode tube for electrically cooking the cavity wall portion which is exposed through said effective fenestra.

4. In an instrument of the character described, a laterally fenestrated endoscopic tube insertable into a body cavity, a laterally fenestrated electrode tube snugly yet rotatably nested within the endoscopic tube, the fenestrae being adapted to be brought into greater or lesser registry by rotation of the electrode tube, whereby the width of the effective fenestra may be varied, and a wire electrode carried within the confines of the electrode tube adjacent to one edge of its fenestra and adapted to electrically cook the cavity wall portion which is exposed through said effective fenestra.

5. In an instrument for resection of a protrusion in a body cavity, a laterally fenestrated endoscopic tube adapted to engage the protrusion in the fenestra, and an electrode tube rotatably mounted within the endoscopic tube and provided with a longitudinally arranged cutting electrode lying entirely within the confines of said electrode tube and adjacent to said fenestra, whereby rotation of the electrode tube will sweep said electrode transversely across said fenestra and thereby excise the engaged protrusion transversely of the cavity axis.

6. In an instrument for resection of a protrusion in a body cavity, a laterally fenestrated endoscopic tube adapted to engage the protrusion in the fenestra, an electrode tube rotatably mounted within the endoscopic tube, a longitudinally arranged cutting electrode carried by the electrode tube for sweeping movement transversely across said fenestra when the electrode tube is rotated, and a scoop arranged on said electrode tube behind said electrode for entrapping the protrusion during its excision by said electrode.

7. In an instrument for resection of a protrusion in a body cavity, a laterally fenestrated endoscopic tube adapted to engage the protrusion in the fenestra, a longitudinally arranged cutting electrode mounted in said tube in insulated relation thereto, said electrode comprising a wire adjacent to but spaced from the walls of said fenestra and substantially coextensive in length with said fenestra, and means for moving said wire bodily through an arc which sweeps it transversely across said fenestra, whereby the engaged protrusion may be excised transversely of the cavity axis by high-frequency electric current applied to it by the encounter therewith of the wire during said movement.

8. In an instrument of the character described, a laterally fenestrated endoscopic tube, an inner rotatable electrode tube, an electrode carried by the latter and adapted to sweep transversely across said fenestra when the electrode tube is rotated, a telescopic tube within the electrode tube, a bearing member for said telescopic tube, means for interlocking said bearing member with said endoscopic tube, and means carried by said bearing member for limiting the arc through which said electrode tube may be rotated.

9. In an instrument of the character described, a laterally fenestrated endoscopic tube, an inner rotatable electrode tube provided with circumferentially spaced projections at its rear end, an electrode carried by the electrode tube and adapted to sweep transversely across said fenestra when the electrode tube is rotated, a telescopic tube within the electrode tube, a bearing member for said telescopic tube, means for interlocking said bearing member with said endoscopic tube, and means carried by said bearing member and encounterable by said projections for limiting the arc through which said electrode tube may be rotated.

10. In an instrument of the character described, an endoscopic tube, an inner rotatable electrode tube provided with a flange at its rear end, circumferentially spaced projections on the forward face of said flange, a bearing member for a telescopic tube, means for interlocking said bearing member with said endoscopic tube to position the bearing member immediately behind said flange, and means carried by said bearing member and extending over the flange and encounterable by said projections for limiting the arc through which said electrode tube may be rotated.

11. In an instrument of the character described, an endoscopic tube, a bearing member, a telescopic tube mounted within the bearing member to permit rotation and also axial movement of the telescopic tube relative to the bearing member, means for interlocking the bearing member with the endoscopic tube, and means carried by the bearing member for limiting the rotative and axial movements of the telescopic tube relative thereto.

12. In an instrument of the character described, an endoscopic tube, a bearing member, a telescopic tube mounted within the bearing member to permit rotation and also axial movement of the telescopic tube relative to the bearing member, means for interlocking the bearing member with the endoscopic tube, and means carried by the bearing member for limiting the rotative and axial movements of the telescopic tube relative thereto; said means comprising a transverse slotted flange on the bearing member, and a longitudinal pin carried by the telescopic tube and projecting through said slot.

13. In an instrument of the character described, an endoscopic tube, a telescopic tube within the former, a bearing member for the telescopic tube, means for interlocking the bearing member with the endoscopic tube, and means carried by the bearing member for limiting the rotative and axial movements of the telescopic tube relative thereto; said means comprising a slotted flange on the bearing member, a longitudinal pin carried by the telescopic tube and projecting through said slot, and abutments at the opposite ends of said pin and adapted to engage said flange when the telescopic tube is shifted axially.

14. As a new article of manufacture, a laterally fenestrated electrode tube of the character described, a longitudinal wire electrode in said tube adjacent to one edge of said fenestra, and an insulating body at the forward end of the tube and having the forward end of the electrode anchored therein.

15. In an instrument of the character described, a laterally fenestrated endoscopic tube insertable into a body cavity, a laterally fenestrated electrode tube snugly yet rotatably nested within the endoscopic tube, the fenestrae being adapted to be brought into varying degrees of registry so as to vary the width of the effective fenestra, means within said electrode tube for electrically cooking the cavity wall portion which is exposed through said effective fenestra, and a telescope in said electrode tube and mounted for rotational adjustment so as to render the resultant effective fenestra visible.

FREDERICK CHARLES WAPPLER.